United States Patent [19]

Tully

[11] 4,102,703
[45] Jul. 25, 1978

[54] WATER-REPELLENT COATING COMPOSITIONS AND METHOD FOR THEIR PREPARATION

[75] Inventor: Paul Raymond Tully, Lowell, Mass.

[73] Assignee: Tulco, Inc., N. Billerica, Mass.

[21] Appl. No.: 739,343

[22] Filed: Nov. 8, 1976

[51] Int. Cl.$^2$ .......................... C09K 3/18; B01J 13/00
[52] U.S. Cl. .......................... 106/287.14; 106/308 N; 106/308 Q; 252/309; 252/316; 106/287.18; 106/287.34
[58] Field of Search .............................. 252/309, 358; 106/287 SB, 308 Q, 308 N

[56] References Cited

U.S. PATENT DOCUMENTS

| | | | |
|---|---|---|---|
| 3,004,921 | 10/1961 | Stossel | 252/309 |
| 3,388,073 | 6/1968 | Domba | 252/358 X |
| 3,560,403 | 2/1971 | O'Hara et al. | 252/358 |
| 3,600,326 | 8/1971 | Wilcox et al. | 106/308 M X |

Primary Examiner—Richard D. Lovering
Attorney, Agent, or Firm—Kenneth W. Brown

[57] ABSTRACT

There are provided water-repellent compositions comprising hydrophobic, finely-divided particulate metal or metalloid oxides. The compositions of the invention are useful in imparting water-repellent properties to porous substrates coated therewith.

27 Claims, No Drawings

WATER-REPELLENT COATING COMPOSITIONS AND METHOD FOR THEIR PREPARATION

FIELD OF THE INVENTION AND PRIOR ART

The present invention relates generally to coating compositions and, more particularly, to liquid coating compositions which impart water-repellent properties to porous substrates coated therewith. In another aspect, the invention also relates to novel masterbatch compositions useful in performing finished water-repellent coating compositions.

In U.S. Pat. Nos. 3,592,679 and 3,617,366, issued on July 13, 1971 and Nov. 2, 1971, respectively, each to Tulley et al., and in U.S. Pat. No. 2,733,160, issued Jan. 13, 1956 to R. K. Iler, there are disclosed methods and compositions useful in imparting water-and/or ice-repellent properties to the surfaces of diverse wares. The methods of these disclosures broadly involve the deposition of a discontinuous coating of a finely-divided particulate hydrophobic metal or metalloid oxide onto the surface of the ware. The hydrophobic nature of the metal or metalloid oxides employed in the practice of the above inventions is disclosed to be achieved by reaction of hydroxyl groups on the surface of the finely-divided oxides with an organic or organosilicon compound, such as a primary alcohol or a hexaalkyldisilazane. Further, useful coating compositions are disclosed comprising the hydrophobic finely divided metal or metalloid oxide dispersed in a volatile inert organic solvent such as a light hydrocarbon or alcohol. While the water-repellent character of wares treated in accordance with the above-cited disclosures is often of generally excellent quality, nevertheless certain difficulties are encountered. Amongst these is the fact that the finished discontinuous hydrophobic metal or metalloid oxide coatings are normally possessed of a hazy or opalescent appearance. Thus, printing on a paper ware coated in accordance with the disclosures of the aforecited references is often obscured by the finished coating. Another very undesirable feature of the hydrophobic oxide-containing coating compositions of the prior art is that the carrier liquids employed are generally comprised wholly or substantially of volatile organic solvents. This, of course, is an undesirable feature because use of volatile organic solvents can often give rise to substantial problems of toxicity, air pollution, fire and/or explosion hazards.

In U.S. Pat. No. 3,393,155, to Shutte et al., July 16, 1968, there is disclosed a pulverulent material comprising hydrophobic pyrogenic silica and an aqueous liquid, the quantity of such pyrogenic silica being less than about one-fifth of the water content of the material. Among the aqueous liquids mentioned are aqueous solutions of glycerol. The claimed pulverulent materials of this patent are produced by combining the hydrophobic silica and aqueous liquid components under sufficiently violent mixing conditions so as to assure contact and intermixing of the silica and aqueous liquid components while each is in a finely-divided state. As regards this patent, the following points should be borne in mind. Firstly, the claimed product thereof is pulverulent in nature and is carefully described as a finely-divided aqueous liquid, the droplets of which are each encapsulated in hydrophobic pyrogenic silica. Accordingly, the Schutte et al. products are, essentially, liquid-gas suspensions, each liquid droplet being encapsulated with a coating of hydrophobic pyrongenic silica and the composite encapsulated liquid droplets being dispersed in a continuous gaseous medium. As will become apparent hereinafter, however, the compositions of the present invention are solidliquid suspensions which behave not as pulverulent solids but as liquids and which suspensions comprise a finely-divided hydrophobic particulate metal or metalloid oxide dispersed in a continuous liquid medium. Thus, the liquid compositions of the present invention can be diluted or let down with water whereas the pulverulent products of the Schutte et al. patent display hydrophobic characteristics and cannot be suspended in further amounts of water while employing conventional mixing techniques. Accordingly, there exist fundamental differences in associations, functions and properties as between the Schutte et al. pulverulent products and the liquid compositions of the present invention. Moreover, although aqueous solutions of glycerol are mentioned in a broad brush manner, Schutte et al. contemplate no criticality whatever for the presence of a liquid polyhydric alcohol in their pulverulent products, which presence is critical to the performance of the liquid compositions of the present invention. Thus, Schutte et al. describe glycerol as a neutral or inert substance for purposes of their pulverulent materials and further describe such diverse water-soluble materials as sodium silicate, dilute acids or acid salts as being equivalent thereto for the purposes of their invention.

OBJECT OF THE INVENTION

It is a principal object of the invention to provide novel coating compositions.

It is another object of the invention to provide novel water-repellent coating compositions for porous substrates, said compositions containing, as a water-repellent ingredient, a hydrophobic finely-divided particulate metal or metalloid oxide.

It is another object of the invention to provide coating compositions which produce substantially haze-free water-repellent finished coatings on porous substrates treated therewith.

It is another object of the invention to provide water-repellent coating compositions comprising a hydrophobic finely-divided particulate metal or metalloid oxide, which compositions contain no volatile organic solvents.

It is another object of the invention to provide a novel masterbatch composition for the production of water-repellent coating compositions.

It is yet another object of the invention to provide a masterbatch composition for the production of water-repellent coating compositions, said masterbatch composition containing, as the active ingredient, a relatively high concentration of a hydrophobic finely-divided particulate metal or metalloid oxide.

It is still another object of the invention to provide a masterbatch composition for the production of water-repellent coating compositions, said masterbatch composition containing, as the active ingredient, a relatively high concentration of hydrophobic finely-divided particulate metal or metalloid oxide and which masterbatch composition can be diluted with water to form the finished coating compositions.

Other objects and advantages of the present invention will in part be obvious and will in part appear hereinafter.

SUMMARY OF THE INVENTION

In accordance with the present invention, it has been discovered that the foregoing objects and advantages are provided by a composition comprising a hydrophobic finely-divided particulate metal or metalloid oxide suspended in a liquid water-soluble polyhydric alcohol or aqueous solution thereof.

DESCRIPTION OF PREFERRED EMBODIMENTS

The oxides useful in the practice of the invention can be any hydrophobic particulate metal or metalloid oxide having a BET-N$_2$ surface area of at least 50 m$^2$/gram and preferably greater than about 100 m$^2$/gram. The average ultimate particle diameters of such oxides will be no greater than about 0.5 micron and will usually be below 0.1 micron. Specific examples of suitable starting material oxides are: silica, titania, alumina, zirconia, vanadia, chromia, iron oxide, silica/alumina, zeolites, and the like. Pyrogenic and precipitated silicas generally constitute the preferred starting material oxides, however.

Pyrogenic silicas are broadly defined as those silicas produced by the oxidation and/or hydrolysis at high temperature (above about 800° C) of a silicon compound such as silicon tetrachloride, silicon tetrafluoride, silicon disulfide, methyltrichlorosilane, and the like. Further details of pyrogenic silica producing processes can be had by reference to U.S. Pat. Nos. 2,428,178, Reik et al.; 2,990,249, Wagner; 3,024,089, Spencer et al.; 3,043,660, Hughes et al.; 3,053,627, Flemmert; 3,086,851, Wagner; 3,130,008, Stokes et al.; 3,203,759, Flemmert; and 3,416,890, Best et al.

Precipitated silicas are produced by the acidulation or neutralization of an aqueous alkali metal silicate solution. Said acidulation or neutralization results in precipitation of a silica hydrosol from solution which is then aged to a gel or semi-gel state, washed free of alkali metal salts, dried and ground to a colloidal impalpable powder. Further details relating to various permutations of the generalized precipitated silica process outlined above can be had by reference to U.S. Pat. Nos. 2,865,777, Allen et al.; 2,913,419, Alexander; 2,995,422, Atkinson et al.; 3,010,791, Allen; 3,034,913, Lagerstrom; 3,172,726, Burke, Jr. et al.; 3,250,586, Wason.

The art of hydrophobing particulate finely-divided metal oxides and metalloid oxides, particularly the silicas, has been extensively developed. In certain instances, such as in the high temperature flame hydrolysis of silicon tetrafluoride, the resulting oxide products are inherently hydrophobic. Generally, however, the finely-divided oxide will be rendered hydrophobic by treatment of a non-hydrophobic oxide starting material with a suitable hydrophobing reagent therefor. For instance, it is known that various organic, organosilicon or organotitanium compounds bearing one or more functional moieties/molecule can be reacted through said functional moieties with hydroxyl groups existing on the surface of finely-divided metal or metalloid oxides so as to render the resulting particulate solid product of reaction hydrophobic. It is also known to render finely-divided oxides hydrophobic by coating of the surfaces thereof with various organic compounds, such as waxes, or various organosilicon compounds such as organosilicon polymers.

I prefer that the reagent employed for the hydrophobing treatment of the finely-divided particulate metal or metalloid oxide be an organosilicon compound and that a chemisorption reaction with the oxide, rather than coating thereof, be effectuated. Specific examples of useful organosilicon compounds for purposes of the invention are: organohalosilanes such as (CH$_3$)$_3$SiCl, (CH$_3$)$_2$SiBr$_2$, (CH$_3$)$_2$SiCl$_2$, (C$_4$H$_9$)$_3$SiCl; organosilylamines such as (CH$_3$O)$_3$Si(CH$_2$)$_3$NH(CH$_2$)$_2$NH$_2$, (CH$_3$O)$_2$(CH$_3$)SiCH$_2$CH(CH$_3$)CH$_2$NHCH$_2$CH$_2$NH$_2$; cyclic organosilazanes such as hexamethylcyclotrisilazane, organocyclosiloxanes such as hexamethylcyclotrisiloxane; polyorganosiloxanes such as polydimethyl siloxanes and polymethylphenylsiloxanes; alkylhydrogen silicon oils; hydroxy-endblocked polydiorganosiloxanes and particularly monohydroxy-endblocked polydiorganosiloxanes such as

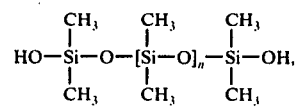

wherein $n$ is an integer $\geq 1$; and organodisilazanes such as (CH$_3$)$_3$SiNHSi(CH$_3$)$_3$ and (C$_4$H$_9$)$_3$SiNHSi(C$_4$H$_9$)$_3$. The organodisilazanes and, in particular, hexalkyldisilazanes such as hexamethyldisilazane, are particularly useful hydrophobing reagents as are the hydroxy-endblocked polyorganosiloxanes.

In addition to the Tulley et al., Iler and Schutte et al. patents previously mentioned details concerning various other processes for hydrophobing treatments of finely-divided metal and metalloid oxides with organic or organosilicon compounds can be had by reference to the following U.S. Pat. Nos. literature: Kistler, 2,589,705; Broge, 2,866,716; Iler, 2,833,723; Iler, 2,657,149; Te Grotenhuis, 3,023,181; Wilcox et al., 3,600,326; Laufer et al., 3,920,865; Lucas, 2,938,009; Penneck, 3,969,308; Swift et al., 3,963,512; Mahn et al., 3,959,176; Laufer, 3,948,676; Goldberg et al., 3,931,067; Hertl, 3,924,032; and Schutte et al., 3,924,029.

In accordance with the practice of the invention employing the preferred surface reacted hydrophobic oxides, it is important that the concentration of organic, organosilicon or organotitanium structures present on the surface of the treated finely-divided oxide provide a carbon concentration, determined by weight loss upon pyrolysis, of at least 0.5% by weight of the treated oxide. Preferably, the concentration of organic or organosilicon structures will be such as to yield a carbon content of at least about 1% by weight of the surface modified oxide and, where the oxide is a pyrogenic silica treated with a hexalkyldisilazane, it is even further preferred that the carbon content be at least 2% by weight of the treated oxide. In determining carbon content it will, of course, be apparent that the carbon content of the starting material oxide should be subtracted from the total final carbon content so as to yield accurate information as to the extent of surface modification of the oxide achieved by the hydrophobing treatment thereof. In the case of pyrogenic and precipitated oxides, however, it is usually the case that the carbon content of the starting material oxide is essentially nil. Accordingly, in these cases, the carbon content of a finely-divided pyrogenic or precipitated oxide prior to the hydrophobing treatment thereof may ordinarily be presumed to be zero.

The amount of the hydrophobic metal or metalloid oxide to be employed in the liquid compositions of the present invention is subject to considerable variation. For instance, it has been found that highly useful water-repellent coatings are provided when the colloidal oxide is employed in a concentration of 1% or even 0.5% by weight of the total composition. At the other end of the spectrum useful compositions, particularly those earmarked for blade coating and dip coating applications or for use as masterbatch compositions to be subsequently let down to a more dilute final concentration, are also provided when the hydrophobic metal or metalloid oxide concentration is relatively high, for instance between 5 and about 25% and even up to about 40% by weight of the total composition. Where the oxide concentration is above about 5% by weight, the consistency of the resulting liquid composition can approach that of a heavy cream or even that of a paste or grease. Moreover, such compositions can also often be found to be quite thixotropic. Thus, the viscosity and flow characteristics of the higher particulate oxide concentration compositions of the invention can be employed to advantage when various specific coating application methods are employed wherein control of sag and/or leveling properties of the liquid coating composition are desirable. Thus, for the purposes of the present invention, the term "liquid", as it applies to the compositions of the invention, refers not only to those compositions having watery, highly fluid consistencies, but also to those compositions having thickened consistencies approaching and including those of pastes or greases. As mentioned, the relatively high oxide concentration compositions of the invention may also be usefully employed as in the role of masterbatch compositions and may thus be let down or diluted with water to final coating compositions comprising substantially lesser overall concentrations of the hydrophobic oxide. In this instance, of course, economies of transportation and storage can be realized since the relatively high oxide concentration masterbatch intermediates comprise lesser quantities of the liquid component relative to the hydrophobic oxide ingredient than the ultimately intended final coating compositions.

A critical ingredient in the compositions of the invention is the liquid component employed to suspend the hydrophobic oxide, the benefits of reduced haze properties of the final coating and the freedom from the necessity for the presence of volatile organic solvents being directly attributable to said liquid component. Accordingly, the liquid component of the compositions of the present invention broadly comprises a water-soluble, liquid (at S.T.P.), polyhydric alcohol or aqueous solution thereof. Specific examples of suitable polyhydric alcohols include, but are not limited to: glycerine, ethylene glycol; propylene glycol; trimethylene glycol; 1,5-pentanediol; 1,6-hexanediol; 2,5-hexanediol; 2,4-heptanediol; diethylene glycol; triethylene glycol; tetraethylene glycol; dipropylene glycol; and mixtures thereof. The preferred polyhydric alcohols for use in the present invention are generally those chosen from the group consisting of monomeric or dimeric $C_2$ to $C_6$ aliphatic diols and triols such as glycerine, ethylene glycol, diethylene glycol and propylene glycol.

In preparing the compositions of the invention, it is important to bear in mind that the hydrophobic finely-divided particulate metal or metalloid oxide should be dispersed into a liquid component of sufficient polyhydric alcohol concentration as to result in a usefully stable suspension. To this end, therefore, adequately stable suspensions of the hydrophobic metal or metalloid oxide can be performed utilizing a liquid polyhydric alcohol alone as the liquid component or can be carried out employing an aqueous solution of sufficient liquid polyhydric alcohol concentration as to assure adequate oxidesuspending properties of the liquid component. When an aqueous solution of a polyhydric alcohol is employed as the liquid component for the suspension of the finely-divided hydrophobic metal or metalloid oxide, it will usually be preferred that said solution have a polyhydric alcohol concentration of at least about 50% by weight thereof. Of course, once the suspension of hydrophobic particulate metal or metalloid oxide has been made in accordance with the above criteria, it will then be usually possible to dilute or let down the resulting suspension with water to the desired final hydrophobic oxide concentration.

Dispersion of the hydrophobic particulate metal or metalloid oxide into the liquid component can be accomplished in any suitable manner, it being necessary only to provide sufficient mixing energy for dispersion of the oxide into the suspending liquid component to occur. Accordingly, it will often be found that simple hand mixing, shaking or laboratory stirring of the particulate oxide and liquid components are sufficiently intensive for purposes of performing the compositions of the invention.

However, another preferred embodiment of the invention is attained when the oxide-containing liquid composition additionally comprises a gaseous component, such as air, colloidally suspended therein. In these preferred suspensoid compositions of the invention, the gas and particulate metal oxide, together, comprise the disperse phase while the liquid component comprises the continuous phase. The precise physical association of the oxide, gas and liquid components existing in the preferred oxide-gas/liquid suspensoid compositions of the invention is not as yet well understood. However, without intention of being bound hereby, it is believed that substantially each hydrophobic oxide particle is encapsulated in a layer of the gas and that these gas-encapsulated oxide particles comprise the disperse phase suspended in the continuous liquid component phase. Of course, where the quantity of gas present in the composition is in excess of that required to encapsulate the oxide particles, such excess gas may exist as yet another distinct disperse phase, separate from and intermingled with the gas-encapsulated oxide disperse phase.

Several advantages have been found to accrue when the compositions of the invention comprise a colloidally suspended gas component. Firstly, the appearance of the finished liquid composition tends to be pleasingly opaque. Secondly, the drying time of such a composition, upon coating of a porous substrate therewith, tends to be substantially less than that of a similar composition comprising essentially no colloidally suspended gaseous component. Thirdly, at equal concentrations of the hydrophobic oxide, the preferred hydrophobic oxide-gas/liquid suspensoid composition of the invention tends to be of more fluid consistency than a similar composition comprising essentially no colloidally dispersed gas component. This last, of course, can be an important consideration when it is desired to produce masterbatch intermediate compositions for subsequent dilution or let down or when it is desired to produce finished relatively fluid liquid compositions containing relatively high concentrations of the metal or metalloid oxide.

In the preparation of these preferred hydrophobic oxide-gas/liquid suspensoid compositions, it has been found that two preparative conditions must be met. Firstly, it is important that the dispersion of the hydrophobic particulate finely-divided metal or metalloid oxide into the liquid component be accomplished under at least relatively intensive mixing conditions. Accordingly, use of mixing equipments capable of imparting vigorous and intensive mixing energy into the system is required. Such high intensity mixing methods and apparatuses are well known in the emulsion and suspensoid production arts. By way of example, for instance, suitable general types of mixing apparatuses include, but are not limited to: high speed stirrers, homogenizers, attritors, dissolvers, sonic mills, colloid mills and the like, each of which type of apparatus is generally capable of incorporating a bulk gas into a liquid and colloidally sub-dividing and suspending the gaseous component within the liquid matrix.

Performance of the preferred oxide-gas/liquid suspensoid compositions of the invention also depends upon the use of a liquid component which, while suspensive of the oxide, does not wet it. Obviously, the wetting characteristics of the many hydrophobic particulate metal or metalloid oxides suitable for use in the preparation of the compositions of the invention are subject to wide variation. Accordingly, those polyhydric alcohols which might otherwise be found unsuitable for performance of the preferred gas-oxide/liquid suspensoid compositions of the invention where a particular finely-divided hydrophobic metal or metalloid oxide component is employed may well be found suitable for use in the preparation of such suspensoids employing a hydrophobic metal or metalloid oxide component having a different wetting character. Accordingly, there exist no well-defined limits as to the polyhydric alcohol liquid component required for the performance of the preferred oxide-gas suspensoid composition. Nevertheless, I have devised a simple test by which it may be determined whether or not a particular polyhydric alcohol liquid component is suitable for use with respect to a particular hydrophobic particulate finely-divided metal or metalloid oxide in the preparation of an oxide-gas/liquid suspensoid composition of the invention. Briefly, said test comprises the preparation of a suspension consisting of 4 parts by weight of the hydrophobic oxide under consideration with 96 parts by weight of isopropanol, a volatile organic solvent. A piece of brown kraft paper is employed as a substrate and a thin coat of the isopropanol/oxide suspension is applied to one surface thereof. The isopropanol component of the coating is removed by drying of the test substrate at from room temperature to no more than about 125° F. Then, discrete drops of those polyhydric alcohols and/or aqueous solutions thereof under consideration as the liquid component of the finished gas-oxide/liquid suspensoid are applied to the oxide-coated surface of the paper substrate. After about two minutes the drops are observed to determine whether substantial diminution of the original size of any thereof has occurred. Further, the uncoated side of the substrate paper is observed for the presence of "strike-through" of the polyhydric alcohol drops. In those instances wherein either of the above-mentioned phenomena are observed to have occurred the wetting properties of those polyhydric alcohols or aqueous solutions corresponding to those drops are considered to be excessive for purposes of performing the gas-oxide/liquid suspensoid embodiment of the invention. On the other hand, any of those polyhydric alcohol drops which are neither substantially diminished in size nor are observed to "strike-through" to the uncoated side of the paper after two minutes are considered to be acceptable polyhydric alcohols or aqueous solutions thereof for use in the performance of the gas-oxide/liquid suspensoid compositions. In this regard, it should be noted and understood that those liquid polyhydric alcohols which, when undiluted, are found to excessively wet the hydrophobic oxide coating of the kraft paper substrate, can often be modified to be acceptably non-wetting of the oxide by admixture with a different liquid polyhydric alcohol or merely by dilution thereof with water. Thus, for instance, where diethylene glycol is found to wet the hydrophobic oxide coating on the paper substrate under the conditions outlined above, and thus be considered as unacceptable in its pure state for use in performance of an oxide-gas/liquid suspensoid of the invention, it will often be found sufficient to dilute the diethylene glycol with water, for instance down to a 70 volume percent glycol/30 volume percent water solution thereof, in order to render the resulting glycol/water solution acceptably non-wetting of the hydrophobic oxide.

While air has thus far been solely mentioned as a specific gas component in the preferred oxide-gas/liquid suspensoid compositions of the invention, it will be obvious that there may also be employed substantially any other gas (at S.T.P.) which is inert, in other words, does not react deleteriously with respect to any of the components of the finished liquid compositions or with respect to the porous substrate ultimately intended to be treated with the finished coating composition. Thus, such classically inert gases as nitrogen, carbon dioxide, helium, argon, neon, will also be generally suitable. However, gases other than the classically inert gases may also be found to be useful and are also within the purview of the present invention. Specific examples of such generally suitable gases are, for instance, dichlorotetrafluoroethane, hexafluoroethane, hexafluoropropylene, tetrafluoromethane, hydrogen and the like. When a specific gas, including air, is contemplated for use in the preparation of the preferred oxide-gas/liquid suspensoid compositions of the invention, one generally suitable method for incorporating it into the liquid component resides in blanketing of the oxide and liquid components with the desired gas during dispersion and suspension of the hydrophobic oxide.

The compositions of the invention find utility as coating compositions for porous substrates. By "porous" it is meant that the substrate, by virtue of its composition, construction or both, possesses the capacity to imbibe the liquid polyhydric alcohol component of the suspending liquid. Thus, substrates such as natural fibers, dried vegetable matter such as peat moss, natural and synthetic yarns and woven and non-woven textiles formed therewith, paper, wood, masonry, unglazed ceramics and flat or aged paint films are all generally amenable to water-repellent treatment thereof with the compositions of the invention.

Application of the coating compositions of the invention to the porous substrate surface can be achieved by any conventional liquid coating method. For instance, my compositions may be applied to porous substrate wares by brushing, roller coating, dip coating, printing, doctor blading, spraying or any other method compatible with the particular ware to be coated. Porous substrates which can be rendered flat, such as papers, textiles, lumber and the like are, in particular, susceptible of treatment with the compositions of the invention by various doctor blading methods, particularly when the coating composition employed is of a creamy or paste-like consistency. Large porous substrates, such as masonry structures, can be coated by conventional, electrostatic or airless spraying techniques, brushing, rollering and the like. Articles such as wooden and paper boxes can be rendered water-repellent by spraying the surfaces thereof with the compositions of the invention. It should be recognized, of course, that the above-described application methods are merely illustrative and are in no way to be considered as limiting of the methods to be employed in applying the coating compositions of the invention.

Subsequent to application of a composition of the invention to the intended porous substrate it is then merely necessary to remove the liquid component of the composition from the surface in order to generate the water-repellent character of the finished coating. Where undiluted polyhydric alcohols are employed as the liquid component of the compositions, removal thereof will normally occur predominately by imbibition of the liquid component into the porous substrate, thereby leaving the hydrophobic particulate finely-divided metal or metalloid oxide component behind on the surface of the substrate. This is believed to be the case because liquid polyhydric alcohols, in general, are possessed of relatively low vapor pressure characteristics, even upon heating thereof. On the other hand, where the liquid component of the coating composition of the invention comprises an aqueous solution of a polyhydric alcohol, it is believed that the water portion thereof will ordinarily be predominately removed by evaporation while the liquid polyhydric alcohol component will be predominately removed by imbibition into the porous substrate. While there is no intent to be bound hereby, it is believed that the mechanism of removal of the polyhydric alcohol from the coating primarily by imbibition thereof into the porous substrate represents an inwardly directed driving force whereby the hydrophobic particulate metal or metalloid oxide is more firmly impregnated into the porous substrate surface than when applied to such surface in the form of a suspension thereof in a volatile organic solvent. Thus, the water-repellent coatings produced in accordance with the present invention tend to have longer service lives than those produced by treatment of porous substrates with suspensions of a hydrophobic particulate finely-divided metal or metalloid oxide in a volatile organic solvent.

As at least partial evidence of the correctness of my theory that the polyhydric alcohol of the liquid component of the compositions of the invention is predominately removed from a treated porous substrate surface by imbibition into the porous substrate rather than by evaporation, it has been noted that a substantial latent period of several hours to several days can exist between the time of coating of a porous substrate and the development of the water-repellent character of the coating. By careful consideration of the quantity of the polyhydric alcohol forming part of the coating, the vapor pressure thereof, and the temperature and relative humidity under which the coated substrate is dried, it has been discovered that removal of the liquid polyhydric alcohol from the coated surface cannot be explained simply through the phenomenon of evaporation from the coated porous substrate surface. Further, when the coating compositions of the invention are applied to non-porous substrates, such as sheet metals or glazed ceramics, so as to inherently require removal of the polyhydric alcohol component solely through evaporation, the latent period for attainment of the water-repellent character of the coatings is generally of extreme and impractical length.

The completed coatings of the invention are characterized by their generally outstanding water-repellent character. Often, said water-repellency is of such magnitude that the treated surface of a coated porous substrate, when dipped beneath the surface of a body of water, will exhibit a striking silvery sheen. This phenomenon is indicative of the formation of a gas layer between the unwet treated surface and the water. Further, on a macroscopic scale, the coatings of the invention are also often found sufficiently water-repellent as to provide a measured contact angle of a droplet of water placed on a flat level surface of a porous substrate bearing the water-repellent coating of greater than 135° and often greater than about 150°.

There follow a number of illustrative, non-limiting examples disclosing various techniques for the preparation and use of the compositions of the invention.

EXAMPLE 1

Into the bowl of a high speed stirring apparatus (Waring Blendor) there is charged 89 parts by weight of ethylene glycol. Next, the stirring apparatus is placed into operation at the high-speed setting thereof and there is then additionally charged into the stirring liquid contents, over a period of about 5 minutes, 11 parts by weight of a hydrophobic particulate finely-divided pyrogenic silica having a BET-$N_2$ surface area of about 225 $m^2$/gram and a carbon content, as determined by weight loss upon pyrolysis of a sample thereof, of about 3 percent by weight of the treated oxide. The hydrophobic nature of this silica is provided by treatment of the starting material pyrogenic silica, having essentially no carbon content, with an organosilicon compound, hexamethyldisilazane, thereby to effectuate chemical bonding of $(CH_3)_3Si$- groups to the silica surface. The hydrophobic character of this silica is so intensive that even extended violent hand shaking thereof with water produces no supsension whatever of the hydrophobic finely-divided silica. Instead, upon cessation of such hand shaking, the silica immediately separates as a separate solid phase lying completely above the surface of the water phase.

Upon operation of the high speed stirring apparatus for a total period of about 15 minutes there results a creamy white opaque liquid product comprising the hydrophobic silica and air suspended in the ethylene glycol liquid. The presence of the air component in the liquid composition is evidenced by a specific gravity thereof of only about 0.98 g/c.c. A portion of this composition is retained and is hereinafter referred to as Sample A.

Another portion of this oxide-gas/ethylene glycol suspensoid is hand stirred with two parts, by weight, of water. The resulting liquid product, which is considerably more fluid in consistency than Sample A, is hereinafter referred to as Sample B.

Yet another portion of the original oxide-gas/ethylene glycol suspensoid is treated by milling thereof on a three-roll mill set at zero nip for a period of about 15 minutes. The resulting liquid product is transluscent rather than opaque and has a specific gravity of 1.20 g/c.c., thereby indicating that nearly all of the air component of the original suspensoid composition has been removed by the milling step. A portion of this milled liquid product, which is of pasty consistency, is retained and is hereinafter referred to as Sample C.

Another portion of the three-roll milled liquid product is diluted with two parts, by weight, of water. The resulting fluid project is hereinafter referred to as Sample D.

Finally, a control composition is prepared by hand mixture of 96 parts, by weight, of isopropanol with about 4 parts, by weight, of the hydrophobic silica. The hydrophobic oxide concentration of this control approaches that of Samples B and D.

Next, employing printed brown heavy kraft paper as a test porous substrate, sample strip coatings of Samples A through D and the control isopropanol suspension are made by sponge coating of the respective samples and control compositions to separate portions of one side of the paper surface. Thereafter, the coated substrate paper is laid flat on a non-porous surface and is allowed to dry at room temperature. From time to time the sample and control coatings are each tested for water repellency by application and observation of a large drop of water thereto. Water repellency is deemed to have occurred when a freshly applied drop of water is observed to bead up on the substrate surface rather than to break down into a film thereover. Further, the coatings are observed for the presence or absence of haze. In the following table there are presented the data resulting from the above tests.

| Sample | Time to Water Repellency (Hours) | Coating Appearance |
| --- | --- | --- |
| Control | 0.25 | Opalescent haze obscuring print |
| A | 24 | Very light haze Essentially no obscuration of print |
| B | 0.5 | Substantially no haze |
| C | 48 | Very light haze Essentially no obscuration of print |
| D | 0.5 | Substantially no haze |

From the above data, it can be seen that all of the coatings prepared in accordance with the invention exhibit markedly improved haze characteristics over the control wherein isopropanol is employed as the liquid component. Further, it is evident from comparisons of the drying times of Samples A through D that the presence of colloidally suspended air and/or dilutions with water in the compositions of the invention can contribute substantially to reduction in the "latent" periods of the coatings, in other words, to reduction of the elapsed times between application of the coatings and development of the water-repellent properties thereof.

Employing the compositions of Samples A through D, coatings were applied to various and diverse porous substrates such as vertical concrete walls, ceramic greenwares, lumber, wool yarns, cotton/polyester fabrics, polyamide felt and cotton felt. The coating application techniques employed were selected on the basis of the ware to be treated and included dip coating and spray coating. Drying of the finished coatings was achieved by natural evaporation and absorption at ambient conditions or by mild heating of the coated wares in an air-circulated oven maintained at about 100° F. In each instance, substantial water-repellent characteristics were achieved within 36 hours and no undue haze developed on the coated porous substrates.

EXAMPLE 2

Preparation of Hydrophobic Aluminum Oxide

Two hundred grams of a fumed particulate finely-divided aluminum oxide, sold under the trade name of "Aluminum Oxide-C" and marketed by Degussa, Inc., New York, New York, was placed into the bowl of a high speed food blendor. Said aluminum oxide has a BET-$N_2$ surface area of about 100 $m^2$/gram. A cover, comprising an inlet port for the injection of liquid therethrough, was placed on the bowl of the blending apparatus and the apparatus then placed into operation on a low speed setting. During this mixing operation 32 grams of a catalyzed dimethylhydrogenpolysiloxane oil were introduced dropwise through the cover inlet port. The polysiloxane oil employed is sold under the trade designation, "L-31 Fluid", by Union Carbide Corp., New York, New York. The catalyst employed was a tin octoate catalyst marketed by M and T Chemicals, Inc., Rahway, New Jersey, and sold under the trade designation, "Catalyst T-9". Upon completion of the dropwise addition of the catalyzed polysiloxane oil, mixing was continued for an additional two minutes whereupon the blendor was stopped and the contents thereof dumped into a glass container. The glass container, containing the aluminum oxide/polysiloxane mixture, was then placed in an air-circulated oven maintained at a temperature of 350° F. After three hours of heating under these conditions the treated aluminum oxide was removed from the oven and cooled. Five grams of the treated finely-divided solid product were then placed into a 3 ounce glass jar along with 30 milliliters of water. Even upon prolonged shaking of the treated oxide/water system on a paint shaker, no suspension of the aluminum oxide into the water phase was achieved. Accordingly, the polysiloxane treated aluminum oxide was adjudged to be very hydrophobic.

Preparation of Composition of the Invention

About 8 parts by weight of the hydrophobic finely-divided particulate aluminum oxide product and about 92 parts by weight of an aqueous solution comprising 70 volume percent diethylene glycol and 30 volume percent water were charged into the bowl of a high speed food blendor. The blendor was then covered and operated at the high speed setting for a period of about five minutes. The resulting product was a creamy opaque liquid consisting of an aluminum oxide-air/aqueous diethylene glycol solution suspensoid having a specific gravity of about 1.04 g/c.c. Said product was found to produce water-repellent coatings of excellent quality when applied to the surfaces of various porous substrates and dried. Dilutions or let downs of this liquid product with up to equal parts by weight thereof of water resulted in more fluid compositions which were also found to be useful in imparting water-repellent properties to diverse porous substrates coated therewith.

EXAMPLE 3

Preparation of a hydrophobic metal oxide was accomplished in a manner substantially similar to that employed in the preparation of the hydrophobic aluminum oxide product of Example 2. However, in the present example, the starting material oxide was a pyrogenic titanium dioxide ("Titanium Dioxide P-25", Degussa, Inc.) having a BET-$N_2$ surface area of only about 50 $m^2$/gram. Also, the treated agent employed was a polydimethylsiloxane oil sold under the trade designation of "L-45 Fluid", Union Carbide Corporation. A liquid composition, employing the hydrophobic titanium dioxide product, was prepared in a manner similar to that set forth in Example 2. The resulting hydrophobic titanium oxide-containing liquid composition was found to be useful as a water-repellent coating when applied to various porous substrates and dried.

EXAMPLE 4

There is prepared a hydrophobic silica-containing liquid composition in a manner similar to that used in Example 2. However, in the present example the finely-divided hydrophobic particulate oxide employed is a hydrophobic precipitated silica product having a BET-$N_2$ surface area of about 110 $m^2$/gram and sold under the trade designation, "D-17", by Degussa, Inc. Results are achieved essentially similar to those obtained with the oxide-containing liquid compositions prepared in Example 2, the completed hydrophobic oxide-gas/liquid suspensoids being found to be useful as water-repellent coating compositions for various porous substrates.

Example 5

The procedure employed in the present example is similar to that utilized in the preparation of Sample A of Example 1. However, in the present example the hydrophobic particulate finely-divided oxide employed is "R-972", a pyrogenic silica product sold by Degussa, Inc. This silica product has a BET-$N_2$ surface area of about 120 $m^2$/gram and is provided with hydrophobic properties by reaction of the raw material silica with dimethyldichlorosilane, the resulting hydrophobic silica product having a carbon content of about 1 percent by weight thereof. The hydrophobic silica-gas/liquid suspensoid produced in this example is determined to provide essentially haze-free water-repellent coatings when applied to various porous substrates and dried.

EXAMPLE 6

To the oxide coated surface of the control drawdown of Example 1 there is applied: (a) a drop of diethylene glycol and (b) a drop of an aqueous solution of diethylene glycol consisting of 70 volume percent of diethylene glycol and 30 volume percent of water. After two minutes it is noted that the drop of diethylene glycol has flattened and wet the coated paper whereas the drop of the aqueous solution of diethylene glycol has beaded up and does not strike through the paper.

Ninety-four parts by weight of the diethylene glycol and 6 parts by weight of hydrophobic particulate finely-divided silica of the same type as employed in Example 1 are charged into a one-quart can and the resulting system mixed by means of a Premier Dispersator, Premier Mill Corp., Temple, Pennsylvania, for a period of about 15 minutes and at a shaft speed of 3000 r.p.m. The resulting suspension of the hydrophobic silica in the diethylene glycol is a translucent viscous liquid which indicates that substantially no gas has been entrained and colloidally dispersed in the diethylene glycol component. Said suspension, when coated onto various porous substrates, is found to provide effective water-repellent coatings, although the latent periods required to attain water repellency of said coatings are also found to be somewhat lengthy. When this relatively viscous original suspension is diluted with an equal part by weight of water, the resulting suspension is found to be considerably more fluid than the original and, moreover, the water-repellent characteristics of coatings prepared therewith are attained in substantially shorter periods of time than realized with the original suspension.

The first of the above preparations is duplicated with the sole exception that the liquid component employed is the aqueous solution of diethylene glycol. In this instance, the resulting suspension is a creamy, white, opaque liquid which is indicative of the fact that air has been colloidally entrained into the liquid component along with the particulate hydrophobic silica. This oxide-gas/liquid suspensoid, although it comprises the same concentration of hydrophobic silica as the originally prepared suspension, is of considerably more fluid consistency. Moreover, coatings thereof applied to various porous substrates are found to dry down to water-repellent properties in considerably shorter periods of time than the original suspension.

Finally, the above procedure is repeated with the exception that 10 parts by weight of the hydrophobic silica are suspended in 90 parts by weight of the aqueous solution of diethylene glycol, thereby increasing the solids concentration over the originally prepared composition by about 66%. In this instance, the resulting composition is again a creamy, white, opaque liquid having a somewhat more fluid consistency than the originally prepared transluscent suspension comprising 6 parts by weight of the hydrophobic oxide in diethylene glycol. This opaque oxide-gas/liquid suspensoid is found to provide effective water-repellent coatings when applied to various porous substrates and the latent periods required to attain water repellency of the coatings prepared therewith were found to be considerably shorter than those of the original transluscent suspension. Similarly, when further diluted with an equal part by weight of water, the resulting suspensoid, which was of more fluid consistency, was also found to provide effective water-repellent coatings on various porous substrates, often accompanied by additional significant reductions in the latent periods required to develop the water-repellent nature of the finished coatings.

EXAMPLE 7

Employing a three-roll mill, 85 parts by weight of propylene glycol and 15 parts by weight of a hydrophobic silica of the same type as employed in Example 1 are made up into a thick paste. Said paste is let down with water to an overall oxide concentration of about 5% by weight of the total composition. The resulting transluscent composition is of a fluid consistency and is found to be effective in providing water-repellent characteristics to various porous substrate surfaces coated therewith.

While this invention has been described with respect to certain embodiments thereof, it is not so limited, and it should be understood that variations and modifications may be made without departing from the essential spirit or scope of the invention.

The embodiments of the invention in which an exclusive property or privilege is claimed are defined as follows:

1. A liquid water-repellent coating composition comprising a hydrophobic finely-divided particulate metal or metalloid oxide having a BET-$N_2$ surface area of at least about 50 m²/gram suspended in a liquid component which does not wet said oxide chosen from the group consisting of liquid, water-soluble polyhydric alcohols and aqueous solutions thereof and an amount of gas colloidally dispersed in said liquid component at least sufficient to encapsulate the hydrophobic finely-divided particulate metal or metalloid oxide in a layer of said gas.

2. The composition of claim 1 wherein said hydrophobic particulate finely-divided metal or metalloid oxide is present in an amount of at least 0.5 percent by weight of the total composition.

3. The composition of claim 1 wherein said gas is air.

4. The composition of claim 1 wherein said hydrophobic particulate finely-divided metal or metalloid oxide is present in an amount of at least 5 percent by weight of the total composition.

5. The composition of claim 1 wherein said hydrophobic metal or metalloid oxide is silica.

6. The composition of claim 1 wherein said hydrophobic metal or metalloid oxide is pyrogenic silica.

7. The composition of claim 1 wherein said hydrophobic metal or metalloid oxide is precipitated silica.

8. The composition of claim 1 wherein said metal or metalloid oxide is rendered hydrophobic by reaction thereof with an organosilicon compound.

9. The composition of claim 8 wherein said organosilicon compound is an organodisilazane.

10. The composition of claim 9 wherein said organosilicon compound is a hexalkyldisilazane.

11. The composition of claim 1 wherein said particulate metal or metalloid oxide is rendered hydrophobic by treatment thereof with an organic, organosilicon or organo-titanium material; has a carbon content, due to said hydrophobing treatment, of at least about 1 weight percent by weight thereof and is present in the composition in the amount of between about 0.5 and about 25 percent by weight of the total composition.

12. The composition of claim 1 wherein said liquid component is an aqueous solution of a liquid polyhydric alcohol.

13. The composition of claim 12 wherein said aqueous solution comprises between about 50 and about 95 percent by weight of said liquid polyhydric alcohol.

14. The composition of claim 1 wherein the liquid polyhydric alcohol is chosen from the group consisting of glycerine, ethylene glycol, diethylene glycol, propylene glycol and mixtures thereof.

15. A method for preparing liquid water-repellent oxide-gas suspensoid coating compositions which comprises intensively mixing, in the presence of a gas, a hydrophobic finely-divided particulate metal or metalloid oxide and a liquid suspending component which does not wet said oxide, said liquid component being chosen from the group consisting of water-soluble liquid polyhydric alcohols and aqueous solutions thereof, and the amount of gas incorporated in the compositions being at least sufficient to encapsulate the finely-divided particulate metal or metalloid oxide in a layer of said gas.

16. The method of claim 15 wherein said gas is air.

17. The method of claim 15 wherein said liquid component is chosen from the group consisting of undiluted polyhydric alcohols and mixtures thereof.

18. The method of claim 17 wherein said polyhydric alcohol is chosen from the group consisting of ethylene glycol, glycerine and mixtures thereof.

19. The method of claim 15 wherein said liquid component is an aqueous solution of a liquid polyhydric alcohol.

20. The method of claim 19 wherein said liquid polyhydric alcohol is chosen from the group consisting of diethylene glycol, triethylene glycol, propylene glycol and mixtures thereof.

21. The method of claim 19 wherein said polyhydric alcohol is present in an amount of at least about 50 percent by weight of said aqueous solution thereof.

22. The method of claim 15 wherein the hydrophobic metal or metalloid oxide is present in an amount of at least about 5 percent by weight of the total suspensoid composition.

23. The method of claim 15 wherein said hydrophobic metal or metalloid oxide is a pyrogenic silica rendered hydrophobic by reaction thereof with an organosilicon compound.

24. The method of claim 23 wherein said organosilicon compound is a hexalkyldisilazane and the carbon content of the hydrophobic silica reaction product is at least 2 percent by weight thereof.

25. The method of claim 23 wherein said organosilicon compound is an organohalosilane.

26. The method of claim 25 wherein said organohalosilane is dimethyldichlorosilane and the carbon content of the hydrophobic silica reaction product is at least 0.5 percent by weight thereof.

27. The method of claim 15 wherein said hydrophobic metal or metalloid oxide is a precipitated silica.

* * * * *